United States Patent
Lin et al.

(10) Patent No.: US 8,684,418 B2
(45) Date of Patent: Apr. 1, 2014

(54) FLEXIBLE DRESS PACKAGE FOR AN END-EFFECTOR EMPLOYED WITH A ROBOTIC ARM

(75) Inventors: Yhu-Tin Lin, Rochester Hills, MI (US); Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 351 days.

(21) Appl. No.: 13/100,964

(22) Filed: May 4, 2011

(65) Prior Publication Data

US 2012/0279602 A1 Nov. 8, 2012

(51) Int. Cl.
*F16L 27/00* (2006.01)

(52) U.S. Cl.
USPC .............................. 285/147.1; 294/65; 269/21

(58) Field of Classification Search
USPC ............. 285/144.1, 298, 153.1, 145.2, 147.1, 285/148.1, 148.4; 269/55, 57, 58, 21, 71; 294/65
See application file for complete search history.

(56) References Cited

U.S. PATENT DOCUMENTS

| | | | | |
|---|---|---|---|---|
| 3,033,381 A * | 5/1962 | Noble et al. | ..................... | 294/65 |
| 3,423,119 A * | 1/1969 | Stanley | ........................... | 294/65 |
| 3,595,556 A * | 7/1971 | Schonauer | ...................... | 269/21 |
| 3,858,547 A * | 1/1975 | Bergfelt | ........................... | 269/57 |
| 4,222,345 A * | 9/1980 | Bergfelt et al. | ................. | 269/57 |
| 4,650,234 A * | 3/1987 | Blatt | ............................... | 294/65 |
| 4,685,714 A * | 8/1987 | Hoke | ............................... | 294/65 |
| 4,770,456 A | 9/1988 | Phillips et al. | | |
| 5,728,258 A * | 3/1998 | Chung | ............................. | 269/21 |
| 5,777,267 A | 7/1998 | Szydel | | |
| 5,833,147 A | 11/1998 | Fuhlbrigge | | |
| 6,244,814 B1 * | 6/2001 | Herbermann et al. | .......... | 294/65 |
| 6,345,818 B1 * | 2/2002 | Stephan et al. | ................. | 294/65 |
| 6,454,333 B2 * | 9/2002 | Portal | ............................. | 294/65 |
| 6,471,189 B2 | 10/2002 | Karlinger | | |
| 6,863,323 B2 * | 3/2005 | Neveu | ............................. | 294/65 |
| 7,029,046 B2 * | 4/2006 | Lim | ................................. | 294/65 |
| 7,039,995 B2 * | 5/2006 | Thompson | ...................... | 269/21 |
| 7,310,865 B2 * | 12/2007 | Cole et al. | ....................... | 269/21 |
| 7,422,031 B2 | 9/2008 | Benson et al. | | |
| 7,622,001 B2 | 11/2009 | Inada et al. | | |
| 7,628,434 B2 * | 12/2009 | Bruce et al. | ..................... | 269/21 |
| 7,790,984 B2 | 9/2010 | Choi | | |
| 7,798,546 B2 * | 9/2010 | Kniss | .............................. | 294/65 |
| 7,971,916 B2 * | 7/2011 | Lin et al. | .......................... | 294/65 |
| 8,172,210 B2 * | 5/2012 | Jeon | ................................ | 269/21 |
| 8,371,631 B2 * | 2/2013 | Lin | ................................. | 294/65 |
| 2009/0194922 A1 | 8/2009 | Lin et al. | | |
| 2010/0140969 A1 | 6/2010 | Lin et al. | | |
| 2010/0180711 A1 | 7/2010 | Kilibarda et al. | | |
| 2010/0234994 A1 | 9/2010 | Shi | | |

* cited by examiner

*Primary Examiner* — David E Bochna (57) ABSTRACT

A conduit system for conducting activation power to a tool module of a reconfigurable end-effector attachable to a robotic arm includes a fixed conduit portion conforming to a first portion of the reconfigurable end-effector including a master boom and a first portion of a rotatable guide rail. The conduit system includes a translatable conduit portion translatably connected to a second portion of the reconfigurable end-effector including a second lateral portion of the rotatable guide rail and a branch. The conduit system includes a rotatable portion connected between an end of the translatable conduit portion and a workpiece interface tool of the tool module.

11 Claims, 5 Drawing Sheets

FLEXIBLE DRESS PACKAGE FOR AN END-EFFECTOR EMPLOYED WITH A ROBOTIC ARM

TECHNICAL FIELD

This disclosure is related to end-effectors for use with a robotic arm.

BACKGROUND

The statements in this section merely provide background information related to the present disclosure and may not constitute prior art.

Known end-effectors attach to robotic apparatuses to manipulate a workpiece during manufacturing processes. An end-effector may grasp a workpiece using tool modules, transport the workpiece to a new location, and orient and release the workpiece. The end-effector is preferably adjustable to permit utilization with workpieces of multiple designs, including adjusting the tool modules. It is known to adjust an end-effector for use with workpieces of multiple designs by manually adjusting tool modules of the end-effector. Manually adjusting the tool modules of the end-effector is known to consume time and may be prone to errors. Applications of robotic apparatuses with end-effectors may encompass material handling, manufacturing, packaging, and testing.

Known workpieces handled by an end-effector include parts or sheet metal panels that are shaped in three-dimensional forms and have large changes of slope and elevation. It may be impractical to design an end-effector with excessively large height extension and swivel angle for tool modules that self-conform to a workpiece.

Known end-effectors connect to a robotic arm with a master boom and adapter to move a workpiece into and out of an associated processing station such as a stamping machine and associated dies. With limited die opening and three dimensional die shapes, a flat end-effector frame with a straight boom may interfere with the dies and machine frames during movement of the workpiece.

Known end-effectors include tool modules having dress packages that house and route conduits for compressed air, hydraulic fluids, and electricity to actuate workpiece interface tools, e.g., vacuum cups and mechanical grippers mounted on their ends. Known dress packages are tie-wrapped or otherwise attached onto a frame of an end-effector. A change or reconfiguration of a tool module on an end-effector requires releasing the tie-wraps to effect such a change. Other known dress packages for tool modules mounted on end-effectors include the hoses loosely held with some slackness for adjustment or movement of gripping components. Hoses and power cables designed to permit a wide range of motion of a tool module may tangle and interfere with other hoses and power cables. Known dress package concerns include setup of an end-effector and tool module to interact with a workpiece, mobility of an end-effector during operation, machine setup time during reconfiguration, and maintainability during service life of the equipment.

SUMMARY

A conduit system for conducting activation power to a tool module of a reconfigurable end-effector attachable to a robotic arm includes a fixed conduit portion conforming to a first portion of the reconfigurable end-effector including a master boom and a first portion of a rotatable guide rail. The conduit system includes a translatable conduit portion translatably connected to a second portion of the reconfigurable end-effector including a second lateral portion of the rotatable guide rail and a branch. The conduit system includes a rotatable portion connected between an end of the translatable conduit portion and a workpiece interface tool of the tool module.

BRIEF DESCRIPTION OF THE DRAWINGS

One or more embodiments will now be described, by way of example, with reference to the accompanying drawings, in which.

DETAILED DESCRIPTION

Referring now to the drawings, wherein the showings are for the purpose of illustrating certain exemplary embodiments only and not for the purpose of limiting the same, FIGS. 1-5 illustrate portions of a reconfigurable end-effector 10 including a plurality of configurable tool modules 50 and a reconfigurable conduit system 60.

Figure 1:
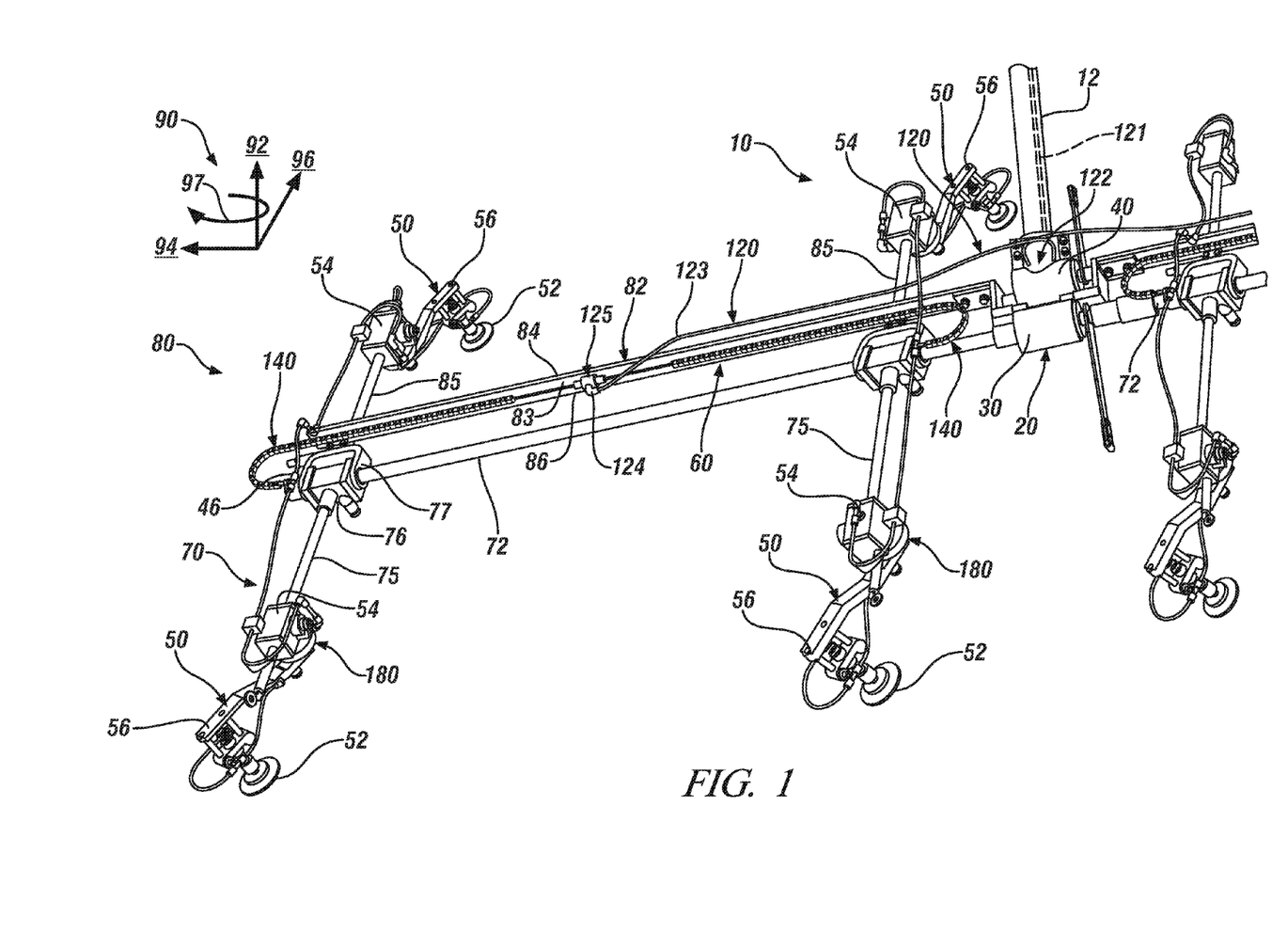
FIG. 1 illustrates a portion of a reconfigurable end-effector including a reconfigurable conduit system including an attached portion, a translatable portion, and a rotatable portion in accordance with the disclosure.

FIG. 1 illustrates a portion of the reconfigurable end-effector 10 including a reconfigurable conduit system 60 conforming thereto. The reconfigurable conduit system 60 includes an attached portion 120, a translatable portion 140, and a rotatable portion 180. The end-effector 10 includes a master boom 12 that attaches to a free end of an articulable robotic arm or another material handling device. In one embodiment, the robotic arm includes a programmable device attached to a base and operative to linearly and rotationally translate the end-effector 10 in space. The robotic arm includes an activation power source in the form of vacuum that is controllably channeled across the end-effector 10 to workpiece interface tools 52 of each of the tool modules 50 via the reconfigurable conduit system 60. A spatial coordinate system described with reference to an x-y-z reference coordinate system 90 including x-axis 92, y-axis 94, z-axis 96, and a rotational angle φ97 about the z-axis 96 provides position reference for the end-effector 10 and the attached tool modules 50. The end-effector 10 is preferably machine-adjusted to a preferred configuration, which defines location of each of the tool modules 50 in relation to the x-y-z coordinate system 90.

The reconfigurable end-effector 10 is preferably arranged in spider-frame configurations that includes a first branch assembly 70 located in a nominal front position (as shown) and a second branch assembly 80 located in a nominal rear position (as shown). A spider-frame configuration includes a limb having one or more branches providing the structural support for the tool modules 50, wherein the branches are attached to the limb element in a cantilever fashion. The first and second branch assemblies 70, 80 each structurally support one or a plurality of the tool modules 50. As described herein, the first and second branch assemblies 70, 80 are moveable and may be arranged in any of a convex configuration, a concave configuration, or a flat configuration to permit the tool module(s) 50 to attach to or interact with a workpiece. As such the articulable robotic arm may employ the reconfigurable end-effector 10 to physically move a workpiece or perform an operation on a workpiece, depending upon a specific operating scheme for the tool module(s) 50.

The master boom 12 couples to a dual articulation mechanism 20 to articulate the first and second branch assemblies 70, 80. The dual articulation mechanism 20 includes a first rotary clutch mechanism 30 and a second rotary clutch mechanism 40. A longitudinal centerline of the master boom 12 defines the x-axis 92 of the x-y-z reference coordinate system 90.

The first branch assembly 70 attaches to the first rotary clutch mechanism 30. The first branch assembly 70 includes a pair of limbs 72 that project from the first rotary clutch mechanism 30 in opposite directions, preferably orthogonal to its longitudinal axis. Longitudinal projections of the limbs 72 preferably define the y-axis 94 of the of x-y-z reference coordinates 90. The z-axis 96 is defined perpendicular to a plane defined by the x-axis 92 and the y-axis 94. Front branches 75 couple via linear locking mechanisms 76 to one of the limbs 72, preferably projecting orthogonally therefrom. The front branches 75 are configured to rotate with rotation of the limbs 72. The pair of limbs 72 are preferably linked to rotate in concert with each other through the first rotary clutch mechanism 30.

The second branch assembly 80 attaches to the second rotary clutch mechanism 40. The second branch assembly 80 includes a pair of guide rails 82 that project from the second rotary clutch mechanism 40 parallel to the limbs 72 of the first branch assembly 70. Each of the guide rails 82 is preferably formed using a single beam element, which is preferably an I-beam that includes a top flange portion 84 and a bottom flange portion 86 coupled via a web portion 83.

Rear branches 85 attach to corresponding front branches 75 and limbs 72 via yokes 77 that are connected to the corresponding linear locking mechanism 76, are slidably coupled to one of the guide rails 82, and preferably project orthogonal to the guide rails 82.

The rear branches 85 are configured to rotate with rotation of the guide rails 82. The guide rails 82 are preferably linked to rotate in concert with each other through the second rotary clutch mechanism 40. The front branches 75 and rear branches 85 are fabricated from suitable material and include one or a plurality of longitudinal splines. Each of the front branches 75 and rear branches 85 has at least one tool module 50 slidably mounted thereon. Ends of the limbs 72 distal to the first rotary clutch mechanism 30 couple to a corresponding end of one of the guide rails 82 distal to the second rotary clutch mechanism 40 using an end bracket 46. Preferably the end brackets 46 are fixedly connected to the ends of the guide rails 82 and rotatably connected to the ends of the limbs 72, thus permitting the limbs 72 to rotate therein.

The yoke 77 translates along the spline shaft of the respective limb 72 in concert with the linear locking mechanism 76. The yoke 77 including the rear branch 85 translates along the guide rail 82. The yoke 77 is free to rotate around the spline shaft of the respective limb 72, allowing the rear branch 85 to rotate independently with respect to the corresponding front branch 75. Rotation of the yoke 77 and associated rear branch 85 is constrained by rotational position of the guide rail 82, which is controlled by the second rotary clutch mechanism 40 using the second input lever 42. The front and rear branches 75, 85 are configured to translate along the length of the respective limb 72 when the linear locking mechanism 76 is unlocked.

Each tool module 50 mounts onto a linear/rotary locking mechanism 54 that slidably mounts on one of the front and rear branches 75, 85, and interacts with the longitudinal splines thereof to prevent rotation about a longitudinal axis of the respective branch 75, 85. The linear/rotary locking mechanism 54 is configured to translate on the respective branch 75, 85 when unlocked and to secure the tool module 50 at a preferred location along the length of the respective branch 75, 85 when locked. Each linear/rotary locking mechanism 54 is preferably pneumatically activated, is preferably configured to remain in a locked position until unlocked, and may be unlocked only when compressed air is injected. Each tool module 50 includes a swing-arm assembly 56 that allows the tool module 50 to be reconfigured in preferred positions to interact with different workpieces.

Each tool module 50 preferably has five degrees of freedom (5-d.o.f.) of movement, and is configurable to a suitable position for its associated workpiece interface tool 52 defined with reference to an x-axis position, a y-axis position, a z-axis position, a rotational angle $\phi$ about the z-axis of the x-y-z coordinate system 90, and a swivel angle $\alpha$. The foregoing details of the spider-frame configuration of the end-effector 10 are illustrative.

FIGS. 1-5 illustrate portions of the reconfigurable conduit system 60 for the reconfigurable end-effector 10. The reconfigurable conduit system 60 is a flexible dress package that is arranged on and attached to selected elements of the end-effector 10 having the spider-frame configuration to facilitate reconfiguration thereof. The reconfigurable conduit system 60 includes the attached portion 120, the translatable portion 140, and the rotatable portion 180. The reconfigurable conduit system 60 channels power from a remote source to each of the workpiece interface tools 52 of the tool modules 50, preferably coincidently, thus allowing the workpiece interface tools 52 to simultaneously grip or release a workpiece. In one embodiment the power channeled from the remote source is vacuum, although the concepts described herein are not so limited. In one embodiment an actuator, e.g., a solenoid-controlled valve is controllable to simultaneously permit or interrupt vacuum flow between the power source and the workpiece interface tools 52. The descriptions herein include references to conduit portions, which are preferably flexible tube portions formed from nylon or other suitable material for transferring vacuum. Other conduit portions may instead be considered.

The attached conduit portion 120 of the reconfigurable conduit system 60 conforms to a portion of the reconfigurable end-effector 10. The attached portion 120 of the reconfigurable conduit system 60 preferably includes a first conduit portion 121 that originates at a distal end of the master boom 12 and is couplable to a vacuum source of the robotic arm using a suitable coupling device. The first conduit portion 121 is preferably routed through an interior portion of the master boom 12 and couples to a master pneumatic manifold 122 at the coupling between the master boom 12 and the dual articulation mechanism 20. The master pneumatic manifold 122 includes a single inlet and two outlets, with the two outlets corresponding to the guide rails 82 in one embodiment. A second conduit portion 123 couples to one of the outlets of the master pneumatic manifold 122, and is routed atop and fixedly connects to the top flange 84 of the respective guide rail 82. The second conduit portion 123 couples to an inlet of a first pneumatic manifold 124 that is attached to the respective guide rail 82. The first pneumatic manifold 124 is preferably located at or near a midpoint of a linear length of the respective guide rail 82 and is connected to the web portion 83 of the guide rail 82. The first pneumatic manifold 124 has two outlets in one embodiment, and is a terminus 125 for the attached portion 120 of the conduit system 60. It is appreciated that there is a corresponding second conduit portion coupled to the other of the two outlets of the master pneumatic manifold 122 that is routed atop and fixedly connected to the top flange of the other guide rail 82 that is coupled to an inlet of another pneumatic manifold located at or near a midpoint of a linear length of the other guide rail 82 and connected to the web portion of the other guide rail 82 on its side in an analogous configuration. This arrangement permits the attached portion 120 of the reconfigurable conduit system 60 to adjust with rotations of the first and second rotary clutch mechanisms 30, 40 of the dual articulation mechanism 20.

Figure 2:
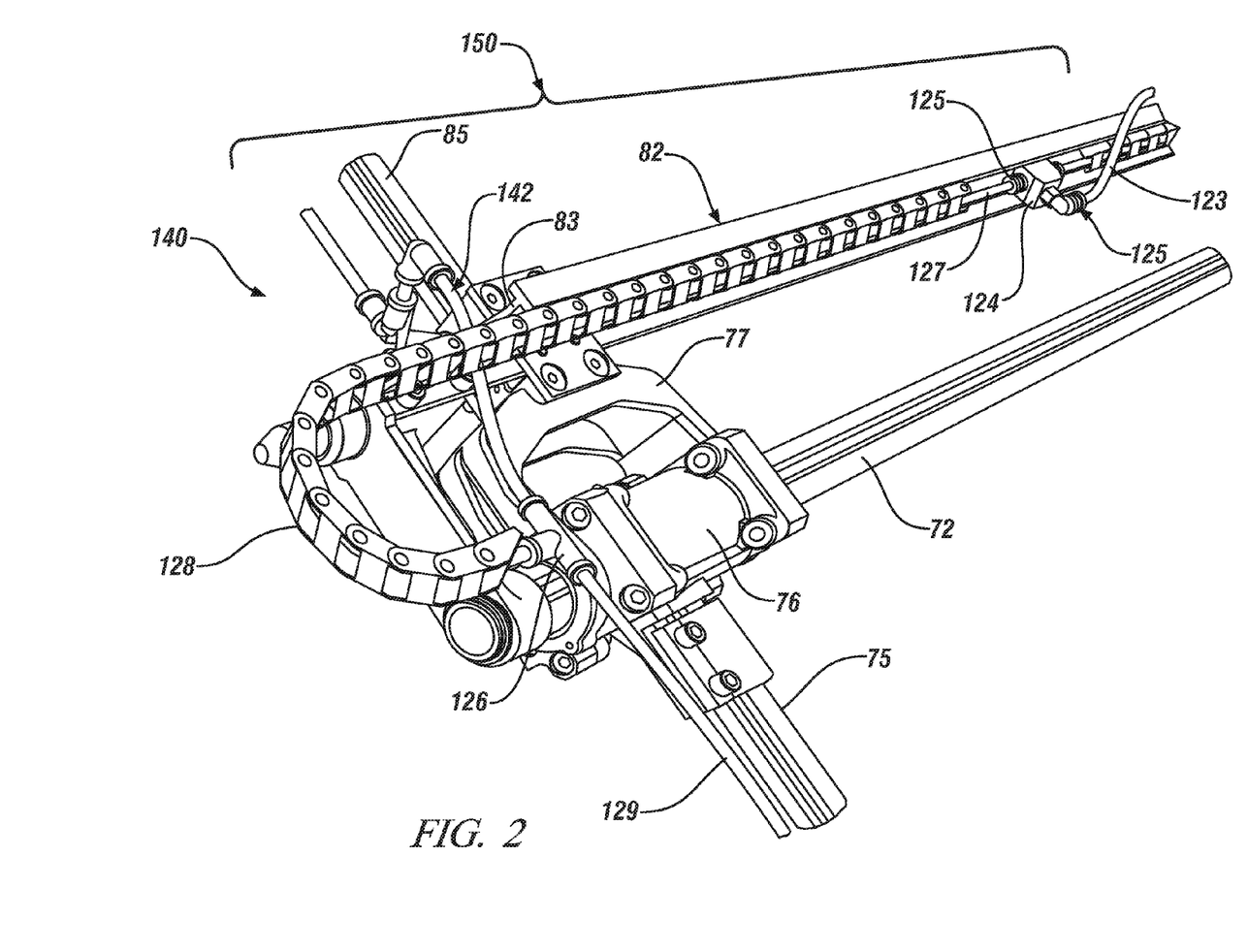
FIGS. 2, 3, and 4 illustrate portions of a reconfigurable end-effector including a translatable conduit portion of the reconfigurable conduit system in accordance with the disclosure.
Figure 3:
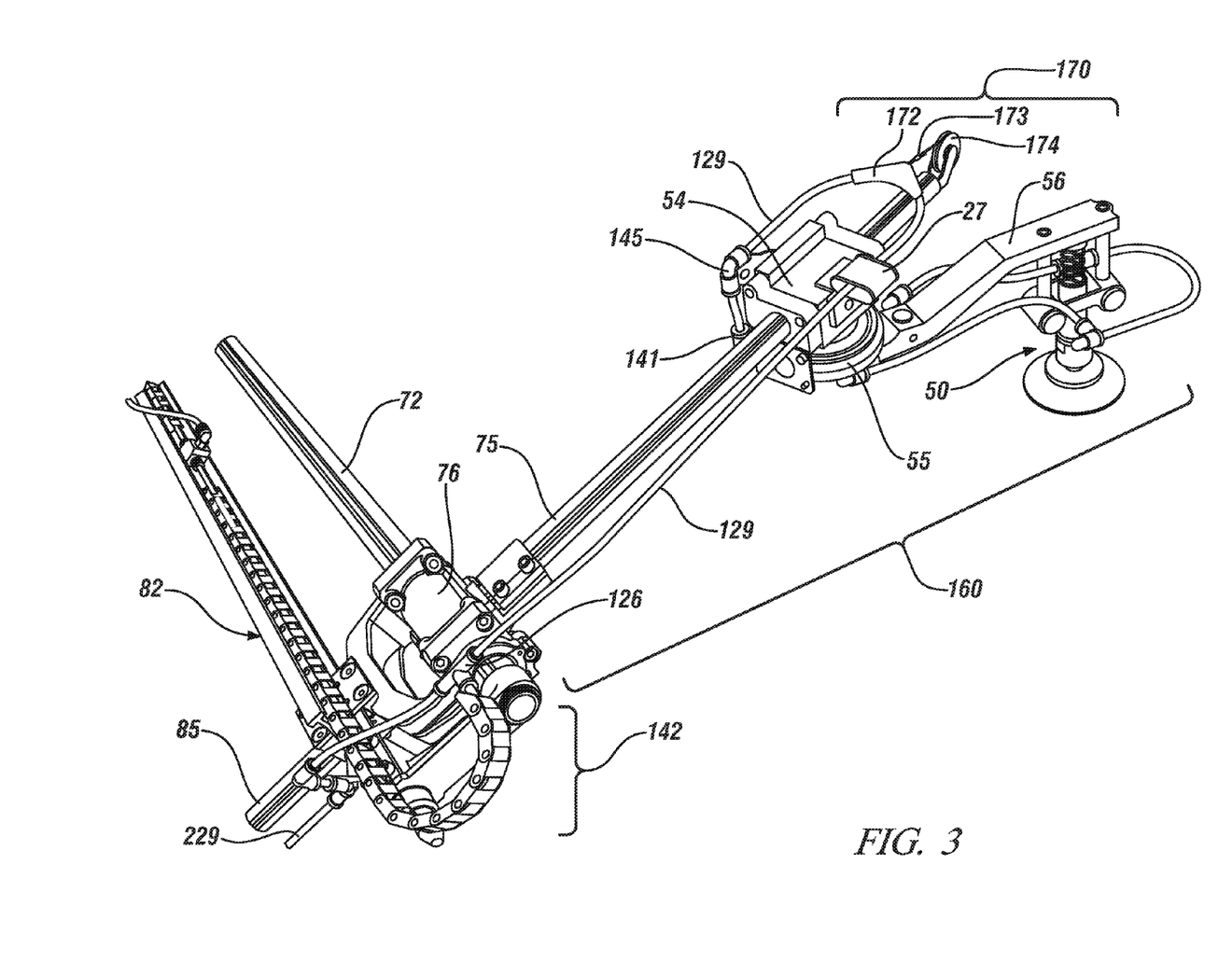
Figure 4:
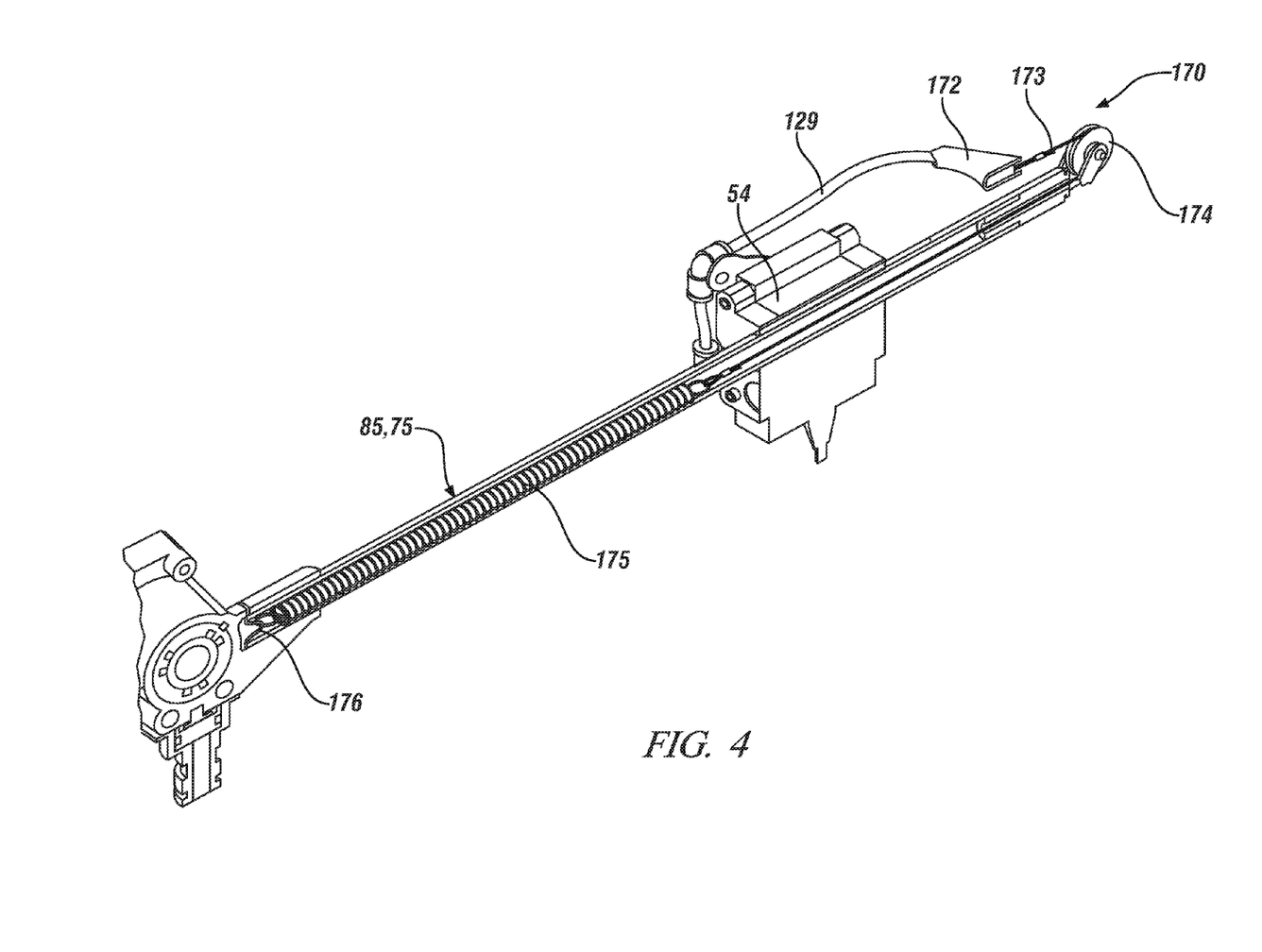

FIGS. 2, 3, and 4 illustrate portions of the translatable portion 140 of the flexible conduit system 60. As shown, the translatable portion 140 of the flexible conduit system 60 extends from the terminus 125 for the attached portion 120 to an inlet port 141 of the tool module 50. The translatable portion 140 provides linearly translatable conduit portions therebetween. The translatable portion 140 includes a first translatable conduit section 150 for translating a portion of the reconfigurable conduit system 60 along one of the guide rails 82 parallel to the y-axis 94, and a second translatable conduit section 160 for translating a portion of the reconfigurable conduit system 60 along one of the branches 75, 85, preferably orthogonal to the first translatable conduit section 150.

The first translatable conduit section 150 includes a third conduit portion 127 contained within a flexible cable carrier 128. The third conduit portion 127 couples to the outlet of the first pneumatic manifold 124 and an inlet of a second pneumatic manifold 126. The second pneumatic manifold 126 is preferably attached to the yoke 77 connected to the associated linear locking mechanism 76. The flexible cable carrier 128 includes a first end attached to the guide rail 82 at or near the first pneumatic manifold 124 and a second end attached to the yoke 77 near the second pneumatic manifold 126. The flexible cable carrier 128 is routed along the guide rail 82 and channeled contiguous to the web portion 83 thereof. The flexible cable carrier 128 including the third conduit portion 127 preferably extends beyond an end of the guide rail 82 with a portion that loops 180° to attach the flexible cable carrier 128 to the yoke 77 and attach the third conduit portion 127 to the second pneumatic manifold 126.

The second translatable conduit section 160 includes a fourth conduit portion 129 and a tensioner 170. The second translatable conduit section 160 extends substantially parallel to either of the associated front and rear branches 75, 85. As shown, the fourth conduit portion 129 of the second translatable conduit section 160 extends substantially parallel to the front branch 75. The fourth conduit portion 129 is a flexible air hose that couples one of the outlets of the second pneumatic manifold 126 to an elbow fitting 145 that is fluidly connected to the air inlet port 141 of the tool module 50. A guide element 27 mounts on the associated linear/rotary locking mechanism 54 to guide the fourth conduit portion 129 in concert with the tensioner 170. The elbow fitting 145 is anchored to the linear/rotary locking mechanism 54 of the tool module 50. The fourth conduit portion 129 includes an intervening loop. The tensioner 170 includes a slide fitting 172 that interacts with the intervening loop of the fourth conduit portion 129. The tensioner 170 uses the slide fitting 172 to generate tension between the intervening loop and a distal end of the corresponding branch 75, with tensile force provided by an extension spring 175. An exemplary embodiment of the tensioner 170 including the slide fitting 172, a wire cable 173, a pulley 174, and the extension spring 175 connected to an anchoring pin 176 is shown with reference to FIG. 4, with the extension spring 175 and the anchoring pin 176 contained within the corresponding one of the front and rear branches 75, 85.

When the linear/rotary locking mechanism 54 is moved along the corresponding associated front or rear branch 75, 85, the extension spring 175 has a preloaded tension to keep the intervening loop of the fourth conduit portion 129 bent in the direction and radius determined by the geometry of the slide fitting 172.

FIG. 3 illustrates one of the tool modules 50 mounted on the linear/rotary locking mechanism 54 on one of the front branches 75. It is appreciated that the tool module 50 mounted on the front branch 75 rotates relative to the yoke 77 and the second pneumatic manifold 126. The tool module 50 mounted on one of the rear branches 85 employs a second translatable conduit section 160 with the tensioner 175 in an analogous manner. In addition, the second translatable conduit section 160 connected to the rear branch 85 is configured with a connector portion 142 to leapfrog the flexible cable carrier 128 in a non-interfering manner using suitable elbows and bent conduits. The connector portion 142 fluidly couples to another fourth conduit portion 229 that extends substantially parallel to the rear branch 85 as shown in an analogous manner. Preferably, the second translatable conduit section 160 is anchored to the guide rail 82 in a suitable manner, e.g., as shown with reference to FIG. 2.

Figure 5:
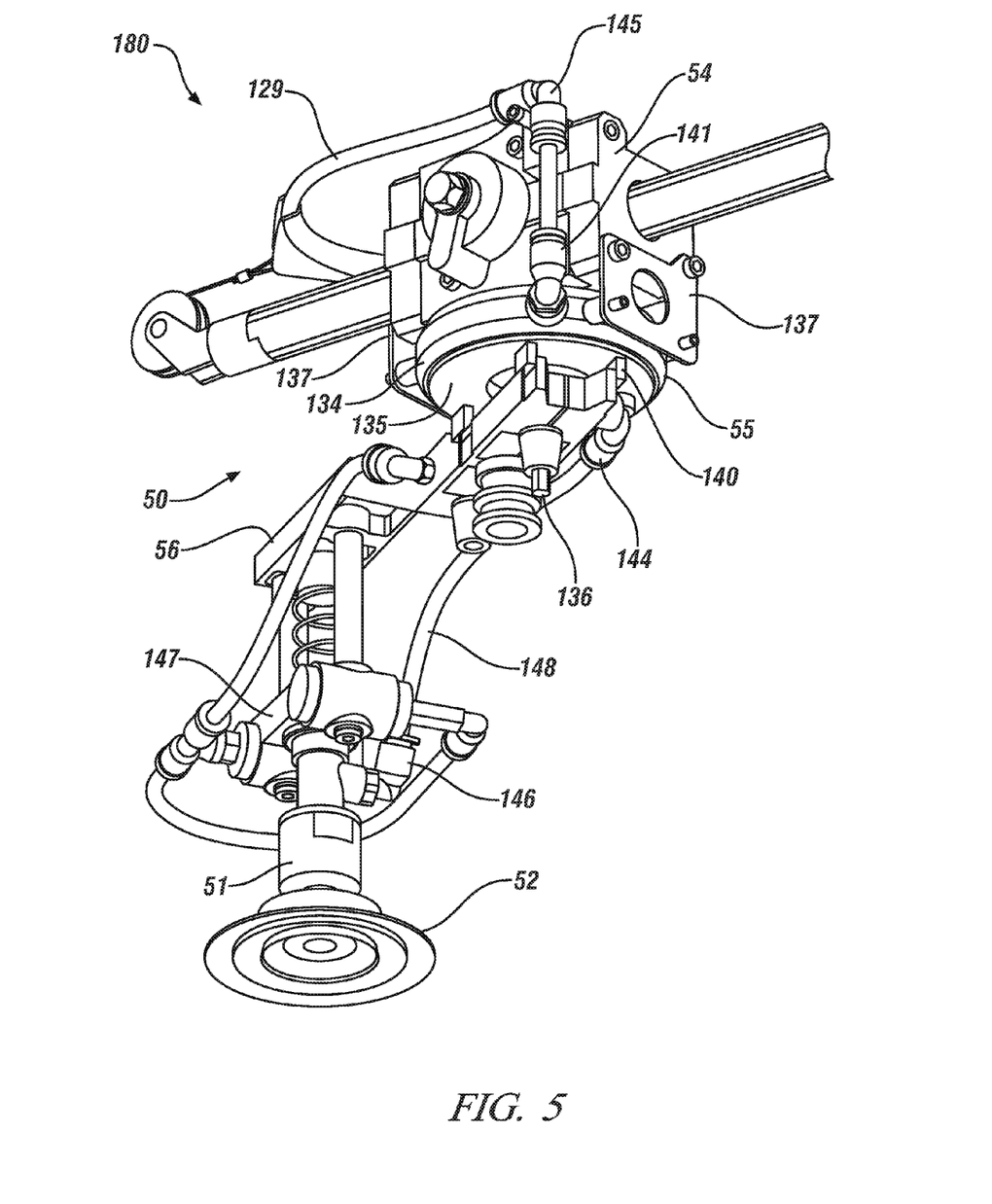
FIG. 5 illustrates a portion of a reconfigurable end-effector including a rotatable conduit portion of the reconfigurable conduit system in accordance with the disclosure.

FIG. 5 illustrates the rotatable portion 180 of the conduit system 60 extending from the inlet port 141 to the tool module 50 to the workpiece interface tool 52. The rotatable portion 180 preferably includes a rotary union device 55 that is integrated in the tool module 50. The rotary union includes the inlet port 141, an outer ring 134 coaxial to an inner ring 135, both which are coaxial to a rotary shaft 136 of the linear/rotary locking mechanism 54 which is preferably integrated therewith. The outer ring 134 shares an annular chamber with the inner ring 135.

The inlet port 141 fluidly couples to the outer ring 134. The outer ring 134 is mounted on brackets 137 attached to the integrated linear/rotary locking mechanism 54. The inner ring 135 is coupled to the swing-arm assembly 56. The inner ring 135 has several protrusions 140 that flank the sides of the swing-arm assembly 56. As a result, the outer ring 134 remains stationary to the integrated linear/rotary locking mechanism 54 and the inner ring 135 is configured to rotate with the swing-arm assembly 56 during end-effector reconfiguration. The rotary union device 55 includes an outlet port 144 that is fluidly coupled to the inner ring 135. Thus, a vacuum flow path includes the inlet port 141 into the outer ring 134 through the annular chamber into the inner ring 135 to the outlet port 144. The outlet port 144 couples via a short air hose 148 to an inlet port 146 of a height-adjustable housing 147. The workpiece interface tool 52 attaches to the height-adjustable housing 147 using a swivel 51. The swivel 51 permits the workpiece interface tool 52 to conform to a workpiece at swivel angle α to allow interaction therewith, e.g., using vacuum supplied via the reconfigurable conduit system 60. As depicted, a single power input, e.g., vacuum supplied to the reconfigurable conduit system 60 may be used to simultaneously activate the workpiece interface tools 52 of the tool modules 50 to pick up a workpiece, or, alternatively to simultaneously deactivate the workpiece interface tools 52 of the tool modules 50 to set down a workpiece.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A conduit system for conducting activation power to a tool module of a reconfigurable end-effector attachable to a robotic arm, comprising:
   a fixed conduit portion conforming to a first portion of the reconfigurable end-effector including a master boom and a first portion of a rotatable guide rail;
   a translatable conduit portion translatably connected to a second portion of the reconfigurable end-effector including a second lateral portion of the rotatable guide rail and a branch; and
   a rotatable portion connected between an end of the translatable conduit portion and a workpiece interface tool of the tool module, wherein the rotatable portion comprises a rotary union device connected between the end of the translatable conduit portion and the workpiece interface tool.

2. A conduit system for conducting activation power to a tool module of a reconfigurable end-effector attachable to a robotic arm, comprising:
   a fixed conduit portion conforming to a first portion of the reconfigurable end-effector including a master boom and a first portion of a rotatable guide rail;
   a translatable conduit portion translatably connected to a second portion of the reconfigurable end-effector including a second lateral portion of the rotatable guide rail and a branch; and
   a rotatable portion connected between an end of the translatable conduit portion and a workpiece interface tool of the tool module;
   wherein the translatable conduit portion comprises:
      a first translatable conduit section configured to translate in a first direction coincident with translation of the branch on a limb portion of the end effector, wherein the first translatable conduit section comprises a flexible conduit portion contained within a flexible cable carrier; and
      a second translatable conduit section configured to translate in a second direction orthogonal to the first direction and coincident with translation of a workpiece interface tool on the branch of the end effector.

3. The conduit system of claim 2, wherein the flexible cable carrier is contiguous to the rotatable guide rail and includes a first end connected to the second lateral portion of the rotatable guide rail and a second end connected to a linear locking mechanism corresponding to the branch.

4. A conduit system for conducting activation power to a tool module of a reconfigurable end-effector attachable to a robotic arm, comprising:
   a fixed conduit portion conforming to a first portion of the reconfigurable end-effector including a master boom and a first portion of a rotatable guide rail;
   a translatable conduit portion translatably connected to a second portion of the reconfigurable end-effector including a second lateral portion of the rotatable guide rail and a branch; and
   a rotatable portion connected between an end of the translatable conduit portion and a workpiece interface tool of the tool module;
   wherein the translatable conduit portion comprises:
      a first translatable conduit section configured to translate in a first direction coincident with translation of the branch on a limb portion of the end effector; and
      a second translatable conduit section configured to translate in a second direction orthogonal to the first direction and coincident with translation of a workpiece interface tool on the branch of the end effector, wherein the second translatable conduit section comprises a flexible conduit portion connected to a tensioner.

5. A conduit system for conducting activation power to a plurality of tool modules of a reconfigurable end-effector attachable to a robotic arm, comprising:
   fixed conduit portions conforming to a master boom of the reconfigurable end-effector and first portions of rotatable guide rails;
   translatable conduit portions translatably connected to second portions of the reconfigurable end-effector including second lateral portions of the rotatable guide rails and a plurality of branch elements; and
   rotatable portions connected between ends of the translatable conduit portions and a plurality of corresponding workpiece interface tools; wherein the rotatable portions comprise a rotary union device connected between the end of one of the translatable conduit portions and the corresponding workpiece interface tool.

6. The conduit system of claim 5, wherein each of the translatable conduit portions comprises:
   a first translatable conduit section configured to translate in a first direction coincident with translation of a branch on a limb portion of the end effector, and
   a second translatable conduit section configured to translate in a second direction orthogonal to the first direction and coincident with translation of a workpiece interface tool on the branch.

7. A reconfigurable conduit system, comprising:
   a fixed conduit portion conforming to a first portion of an end-effector including a master boom and a first portion of a rotatable guide rail;
   a translatable conduit portion translatably connected to a second portion of the end-effector including a second portion of the rotatable guide rail and a branch;
   a rotatable portion connected between an end of the translatable conduit portion and a tool module including a workpiece interface tool; and
   the reconfigurable conduit system configured to conduct activation power to the workpiece interface tool;
   wherein the tool module comprises a rotary union device connected between the end of the translatable conduit portion and the workpiece interface tool.

8. The conduit system of claim 7, wherein the translatable conduit portion comprises:
   a first translatable conduit section configured to translate in a first direction coincident with translation of the branch on a limb portion of the end effector, and
   a second translatable conduit section configured to translate in a second direction orthogonal to the first direction and coincident with translation of a workpiece interface tool on the branch.

9. A reconfigurable conduit system, comprising:
   a fixed conduit portion conforming to a first portion of an end-effector including a master boom and a first portion of a rotatable guide rail;
   a translatable conduit portion translatably connected to a second portion of the end-effector including a second portion of the rotatable guide rail and a branch;
   a rotatable portion connected between an end of the translatable conduit portion and a tool module including a workpiece interface tool; and the reconfigurable conduit system configured to conduct activation power to the workpiece interface tool;
wherein the translatable conduit portion comprises:
a first translatable conduit section configured to translate in a first direction coincident with translation of the branch on a limb portion of the end effector, wherein the first translatable conduit section comprises a flexible conduit portion contained within a flexible cable carrier; and
a second translatable conduit section configured to translate in a second direction orthogonal to the first direction and coincident with translation of a workpiece interface tool on the branch.

10. The conduit system of claim 9, wherein the flexible cable carrier is contiguous to the rotatable guide rail and includes a first end connected to the second lateral portion of the rotatable guide rail and a second end connected to a linear locking mechanism corresponding to the branch.

11. A reconfigurable conduit system, comprising:
a fixed conduit portion conforming to a first portion of an end-effector including a master boom and a first portion of a rotatable guide rail;
a translatable conduit portion translatably connected to a second portion of the end-effector including a second portion of the rotatable guide rail and a branch;
a rotatable portion connected between an end of the translatable conduit portion and a tool module including a workpiece interface tool; and
the reconfigurable conduit system configured to conduct activation power to the workpiece interface tool;
wherein the translatable conduit portion comprises:
a first translatable conduit section configured to translate in a first direction coincident with translation of the branch on a limb portion of the end effector, and
a second translatable conduit section configured to translate in a second direction orthogonal to the first direction and coincident with translation of a workpiece interface tool on the branch, wherein the second translatable conduit section comprises a flexible conduit portion connected to a tensioner.

* * * * *